(12) United States Patent
Dhyanchand et al.

(10) Patent No.: US 6,462,429 B1
(45) Date of Patent: Oct. 8, 2002

(54) INDUCTION MOTOR/GENERATOR SYSTEM

(75) Inventors: John Dhyanchand, Rockford; Donald G. Fair, Belvidere; Chai-Nam Ng, Rockford, all of IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/512,163

(22) Filed: Feb. 24, 2000

(51) Int. Cl.[7] .............................................. F02N 11/04
(52) U.S. Cl. ............................ 290/31; 290/6; 310/179; 310/184
(58) Field of Search ..................... 290/31, 9 R, 6, 290/38 R, 46, 22; 310/179, 113, 184, 210, 211, 125; 322/10, 47; 363/49; 318/778

(56) References Cited

U.S. PATENT DOCUMENTS

| | | | | |
|---|---|---|---|---|
| 3,675,117 A | * | 7/1972 | Reimers ...................... 322/31 |
| 3,908,130 A | | 9/1975 | Lafuze ......................... 290/46 |
| 3,931,535 A | * | 1/1976 | Roesel, Jr. ................... 310/113 |
| 4,330,743 A | | 5/1982 | Glennon ....................... 322/10 |
| 4,401,938 A | | 8/1983 | Cronin ......................... 322/29 |
| 4,473,752 A | * | 9/1984 | Cronin ..................... 290/38 R |
| 4,481,459 A | | 11/1984 | Mehl et al. ................... 322/10 |
| 4,743,776 A | | 5/1988 | Baehler et al. ............... 290/31 |
| 4,772,802 A | | 9/1988 | Glennon et al. ............. 290/31 |
| 4,830,412 A | | 5/1989 | Raad et al. ................... 290/31 |
| 4,862,009 A | | 8/1989 | King ............................ 290/22 |
| 4,968,926 A | | 11/1990 | Dhyanchand ................ 322/10 |
| 5,013,929 A | | 5/1991 | Dhyanchand ................ 290/31 |
| 5,028,803 A | | 7/1991 | Reynolds ...................... 290/31 |
| 5,055,700 A | * | 10/1991 | Dhyanchand ................ 290/31 |
| 5,068,590 A | | 11/1991 | Glennon et al. ............. 322/10 |
| 5,430,362 A | * | 7/1995 | Carr et al. ................... 318/779 |
| 5,587,647 A | * | 12/1996 | Bansal et al. ................. 322/45 |
| 5,684,690 A | * | 11/1997 | Levedahl ..................... 363/178 |
| 5,836,085 A | * | 11/1998 | Ben-Ezra ...................... 34/270 |
| 5,888,550 A | * | 3/1999 | Cook et al. ................. 424/490 |
| 5,986,438 A | * | 11/1999 | Wallace et al. .............. 322/20 |
| 6,232,691 B1 | * | 5/2001 | Anderson ................... 310/179 |

FOREIGN PATENT DOCUMENTS

WO  WO 88/00653  1/1988 ........... F02N/11/00

* cited by examiner

*Primary Examiner*—Joseph Waks
(74) *Attorney, Agent, or Firm*—Marshall Gerstein & Borun

(57) ABSTRACT

A generator/starter system for starting an engine and for tapping power from the engine in order to generate electricity includes a squirrel cage rotor, a main stator winding, an auxiliary stator winding, and an excitation source. The main stator winding is magnetically coupled to the squirrel cage rotor so as to provide an AC output in response to rotation of the squirrel cage rotor and so as to rotate the squirrel cage rotor in response to an AC input. The auxiliary stator winding is magnetically coupled to the squirrel cage rotor so as to provide excitation current when the main stator winding is providing the AC output. The source of excitation current is coupled to the auxiliary stator winding.

9 Claims, 9 Drawing Sheets

INDUCTION MOTOR/GENERATOR SYSTEM

TECHNICAL FIELD OF THE INVENTION

The present invention relates to an induction machine which can be used, for example, as both a starting motor and an electrical generator in an aircraft electrical system.

BACKGROUND OF THE INVENTION

Power conversion systems, such as those used on aircraft to generate electrical power, typically include a brushless, three-phase synchronous generator which operates in a generating mode in order to convert variable speed motive power supplied by a prime mover, such as an engine, to electrical power. This three-phase synchronous generator can also be operated as a motor in a starting mode in order to convert electrical power supplied by an external electrical power source to motive power that is used to turn the engine and bring the engine up to its self-sustaining speed.

A typical brushless, three-phase synchronous generator includes a permanent magnet generator (PMG), an exciter, and a main generator all mounted on a common drive shaft. During starting, it is known to provide electrical power at a controlled voltage and frequency to the armature windings of the main generator and to provide field current to the main generator by way of the exciter so that motive power may be developed when the generator operates as a motor. For example, two separate inverters have been used in the past, one to provide electrical power to the main generator armature windings, and the other to provide electrical power to the exciter.

Once the engine is brought up to self-sustaining speed, the brushless, three-phase synchronous generator can be operated in its generating mode during which excitation current is provided to the exciter, and the main generator winding provides three-phase electrical output power.

Accordingly, the typical brushless, three-phase synchronous generator requires a rotor (i.e., armature) having windings and usually circuit components such as diodes. These windings and/or circuit components limit the speed with which the rotor can turn because, if the rotor turns too fast, the windings and/or circuit components may be ejected from the rotor due to centrifugal forces exerted by these rotating components, resulting in failure of the brushless, three-phase synchronous generator. Thus, for a given output power, an increase in rotating speed of an electrical machine requires that its size and weight be reduced.

On the other hand, induction machines, which use a squirrel cage rotor, avoid this problem because the squirrel cage rotor is solid, robust, light weight, and has no windings or circuit components. Therefore, it has been known to use induction machines as motors on aircraft. Induction machines, which have been used as generators, have only one stator winding. Moreover, it is generally thought that an induction machine operating as a generator must have its rotor driven above its synchronous speed, i.e., in a negative slip condition.

It is also generally thought that an induction machine cannot operate as a generator unless there is at least one synchronous generator available to excite it, and that an induction machine cannot supply its own excitation. However, some induction machines which have been used in the past as generators have relied upon a bank of capacitors connected across the stator winding by contactor switches in order to provide excitation current. The contactor switches control the current flow through the capacitors in order to control the excitation current. If the capacitive current drawn from the stator of the induction machine could be controlled properly and precisely, the induction machine could be self-excited in order to generate voltage at the same terminals where the capacitive current is drawn.

The present invention is directed to an induction machine that can be used as both a motor and a generator. The present invention is also directed to an arrangement permitting proper and precise control of the capacitive current drawn from the stator of the induction machine.

SUMMARY OF THE INVENTION

In accordance with one aspect of the present invention, an induction machine comprises a squirrel cage rotor, a main stator winding, an auxiliary stator winding, and a source of excitation current. The main stator winding and the auxiliary stator winding are magnetically coupled to the squirrel cage rotor. The source of excitation current is coupled to the auxiliary stator winding.

In accordance with another aspect of the present invention, an induction machine comprises a squirrel cage rotor, first, second, and third stator windings magnetically coupled to the squirrel cage rotor, first, second, and third capacitors coupled to the first, second, and third stator windings, respectively, and a solid state switch. The solid state switch is coupled to the first, second, and third capacitors, and the solid state switch is arranged to switch the first, second, and third capacitors so as to control excitation current supplied to the first, second, and third stator windings.

In accordance with yet another aspect of the present invention, a generator/starter system for starting an engine and for tapping power from the engine in order to generate electricity comprises a squirrel cage rotor, a main stator winding, an auxiliary stator winding, and a source of excitation current. The main stator winding is magnetically coupled to the squirrel cage rotor so as to provide an AC output in response to rotation of the squirrel cage rotor and so as to rotate the squirrel cage rotor in response to an AC input. The auxiliary stator winding is magnetically coupled to the squirrel cage rotor so as to excite the main stator winding. The source of excitation current is coupled to the auxiliary stator winding.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
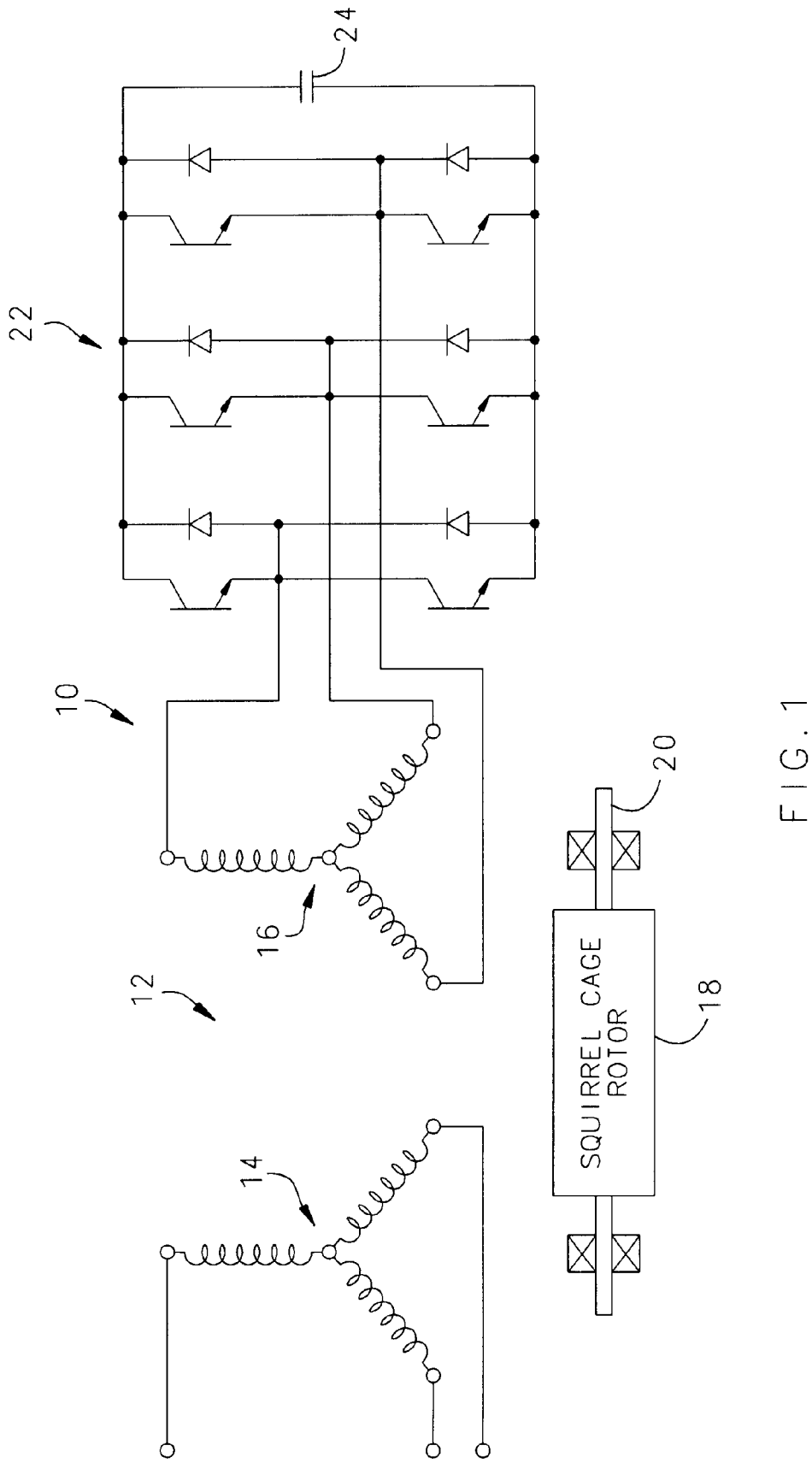
FIG. 1 is a schematic diagram of a power conversion system employing an induction motor/generator system according to a first embodiment of the present invention.

Like reference numerals are used to designate like elements in FIGS. 1–9. As shown in FIG. 1, a power conversion system 10 includes an induction machine 12 having a main stator winding 14 and an auxiliary stator winding 16. The main stator winding 14 and the auxiliary stator winding 16 are magnetically coupled to a squirrel cage rotor 18 having a shaft 20 extending through suitable bearings. A pulse width modulation (PWM)inverter 22 is connected to the auxiliary stator winding 16. The PWM inverter 22 converts a voltage supplied by a DC storage capacitor 24 after starting to pulse width modulated signals which are supplied appropriately to the phases of the auxiliary stator winding 16 during excitation.

Accordingly, when the induction machine 12 is operated as a generator, the squirrel cage rotor 18 is turned by a prime mover, such as the engine of an aircraft. Excitation current is supplied to the auxiliary stator winding 16 by the PWM inverter 22 which receives input DC from the DC storage capacitor 24 and which is controlled by a suitable controller (not shown). The PWM inverter 22 converts this input DC to a three-phase current for supply to the auxiliary stator winding 16. The controller, for example, may include a feed back arrangement in which the output of the main stator winding 14 is compared to a reference to form an excitation current reference, this excitation current reference is compared to the excitation current supplied by the PWM inverter 22 to the auxiliary stator winding 16 to form an error signal, and this error signal feeds a PWM controller which has six outputs in order to control the switches of the PWM inverter 22. Alternatively, this error signal may feed a bang-bang amplifier controller instead of a PWM controller in order to control the switches of the PWM inverter 22.

As the squirrel cage rotor 18 turns in the presence of the magnetic field generated by the excitation current flowing through the auxiliary stator winding 16, a three-phase voltage is induced across the main stator winding 14. This three-phase voltage delivers current to the electrical loads of the aircraft.

When the induction machine 12 is operated as a starter, the main stator winding 14 is connected to an AC bus which may be sourced by a ground cart, an auxiliary power unit, or any other suitable source of starting AC. The frequency of the AC on this AC bus is gradually increased in order to increase the turning speed of the squirrel cage rotor 18 until the engine motored by the squirrel cage rotor 18 reaches its self-sustaining speed. Once the engine has its reached self-sustaining speed, the starting AC can be removed from the AC bus, and the induction machine 12 can then begin generating electricity as an output of the main stator winding 14, as described above.

The main stator winding 14 and the auxiliary stator winding 16 of the induction machine 12 may be wound so as to control the phase between the voltages generated therein. Also, the number of turns in the auxiliary stator winding 16 as compared to the main stator winding 14 determines the desired excitation current supplied by the PWM inverter 22 for a given DC link voltage across the DC storage capacitor 24. The turn ratio is used to match the voltages across the main stator 14 with a given DC link input voltage supplied to the PWM inverter 22.

If the power conversion system 10 were lossless, the DC storage capacitor 24 would be adequate as the source of the PWM inverter 22, because the DC storage capacitor 24 would be kept charged by current circulating between the PWM inverter 22 and the auxiliary stator winding 16. All that would be required is to charge up the DC storage capacitor 24 from a supply during start up. Once the main stator winding 14 generates voltage, this start up supply may be removed. However, because the power conversion system 10 is not lossless due to losses in the switches of the PWM inverter 22 and due to resistive losses in the windings of the auxiliary winding 16, a supplemental power source must be provided for the PWM inverter 22. Examples of supplemental power sources are shown in the embodiments below.

Figure 2:
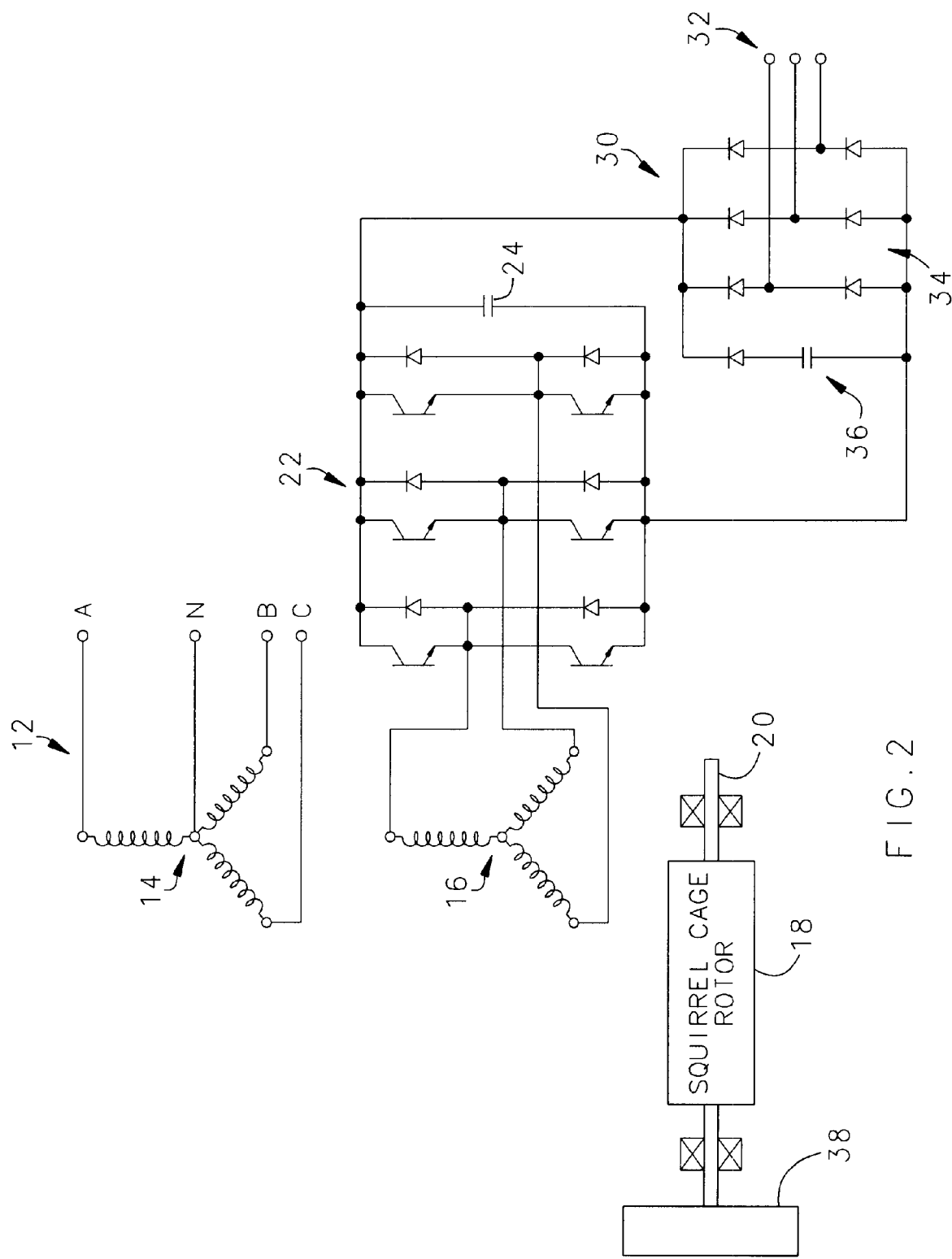
FIG. 2 is a schematic diagram of a power conversion system employing an induction motor/generator system according to a second embodiment of the present invention.

FIG. 2 shows a second embodiment of a power conversion system in which a supplemental source 30 for the PWM inverter 22 includes an AC bus 32 connected through a full wave, three-phase rectifier bridge 34 to the DC rails of the PWM inverter 22. In this second embodiment, the main stator winding 14 may be supplied with power during starting as in the case of the first embodiment. When the induction machine 12 is used as a generator, the output AC from the main stator winding 14 may be used to source the AC bus 32 with three-phase AC which is rectified to DC by the full wave, three-phase rectifier bridge 34.

A battery 36 may also be connected to the PWM inverter 22 as a further supplemental source of excitation current. The battery 36 could be used as an alternative to the supplemental source 30, or it can be used in addition to the supplemental source 30.

As also shown in FIG. 2, an engine 38 is mechanically coupled to the shaft 20 of the squirrel cage rotor 18. Accordingly, during starting, AC power is supplied by the PWM inverter 22 to the auxiliary stator winding 16 with increasing frequency in order to turn the squirrel cage rotor 18. As the squirrel cage rotor 18 turns, the engine 38 turns. When the squirrel cage rotor 18 turns fast enough to reach the self-sustaining speed of the engine 38, control of the PWM inverter 22 is switched from supplying AC power to the auxiliary stator winding 16 to supplying excitation current for the main stator winding 14. Accordingly, as excitation current is supplied by the PWM inverter 22 to the auxiliary stator winding 16, the induction machine 12 is operated as a generator with the main stator winding 14 supplying output AC for use by the electrical loads of the vehicle on which the engine 38 is used.

Figure 3:
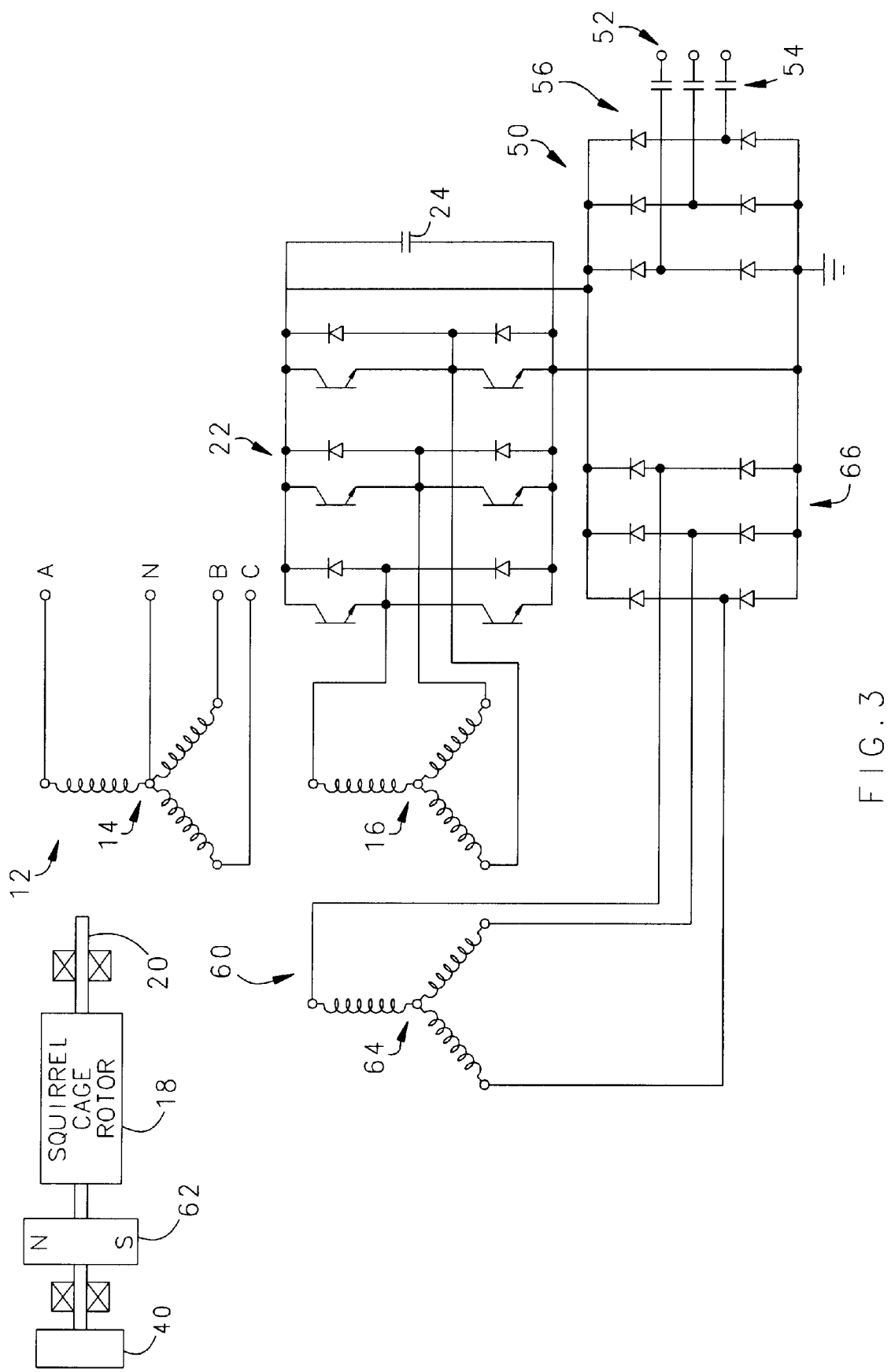
FIG. 3 is a schematic diagram of a power conversion system employing an induction motor/generator system according to a third embodiment of the present invention.

However, it is noted that the engine 38 is a variable speed prime mover. Therefore, the frequency of the AC output provided by the main stator winding 14, when the induction machine 12 is operated as a generator, is variable. Because many electrical loads require constant frequency AC to properly operate, a constant speed drive 40, as shown in FIG. 3, may be mechanically coupled between the engine 38 and the shaft 20 of the squirrel cage rotor 18. Accordingly, when the induction machine 12 is used as a generator, the constant speed drive 40 ensures that the squirrel cage rotor 18 turns at a constant speed even though the engine 38 turns at a variable speed. Thus, with the squirrel cage rotor 18 turning at a constant speed, the power conversion system shown in FIG. 3 supplies constant frequency power at the output of the main stator winding 14.

As shown in FIG. 3, a source 50 is arranged to provide starting power to the auxiliary stator winding 16. The source 50 includes an AC tie bus 52 connected through contactor switches 54 and a full wave, three-phase rectifier bridge 56 to the PWM inverter 22. During starting, a ground cart, an auxiliary power unit, or any other suitable source of starting AC is connected to the AC tie bus 52, and the contactor switches 54 are closed. The switches of the PWM inverter 22 are controlled so as to supply an AC signal initially having a low frequency to the auxiliary stator winding 16. The squirrel cage rotor 18 begins turning the engine 38 through the constant speed drive 40. As the switches of the PWM inverter 22 are controlled to increase the frequency of the AC supplied to the auxiliary stator winding 16, the speed of rotation of the squirrel cage rotor 18 increases. When the squirrel cage rotor 18 reaches the self-sustaining speed of the engine 38, the contactor switches 54 may be opened in order to remove the starting AC from the PWM inverter 22. The induction machine 12 can then begin generating electricity as an output of the main stator winding 14. During starting, starting AC also can be supplied to the main stator winding 14.

When the induction machine 12 is used as a generator, the PWM inverter 22 in the embodiment shown in FIG. 3 is supplementally sourced by a permanent magnet generator 60. The permanent magnet generator 60 has a permanent magnet 62, which is mechanically coupled to the shaft 20 of the squirrel cage rotor 18, and a winding 64, which is magnetically coupled with the permanent magnet 62. Accordingly, as the shaft 20 is rotated by the squirrel cage rotor 18, the permanent magnet 62 also rotates thereby inducing a voltage across the winding 64 of the permanent magnet generator 60. This induced voltage is supplied to a full-wave rectifier bridge 66 which rectifies the output current supplied by the winding 64 to DC that is applied to the PWM inverter 22.

Figure 4:
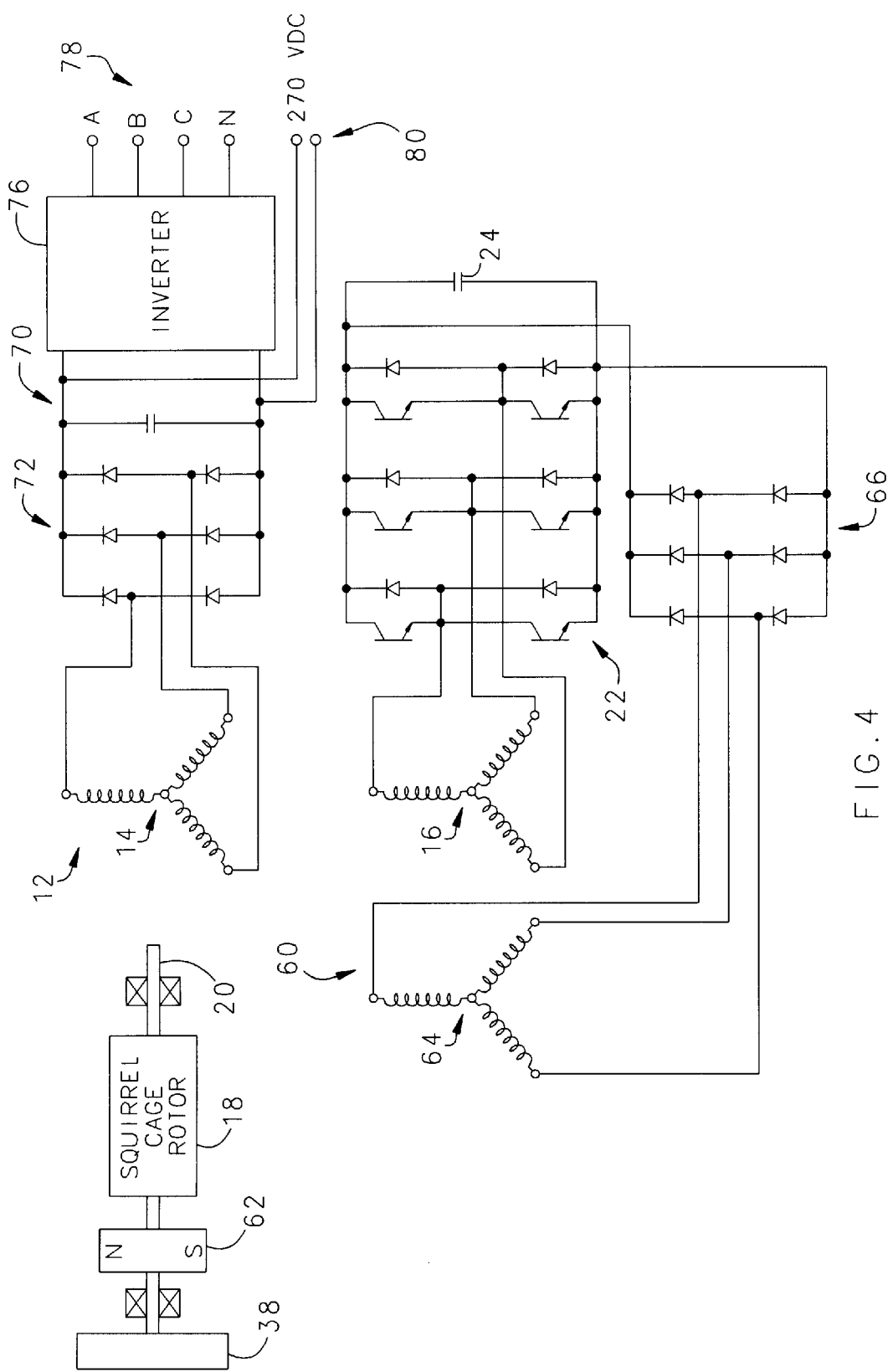
FIG. 4 is a schematic diagram of a power conversion system employing an induction motor/generator system according to a fourth embodiment of the present invention.

Instead of using the constant speed drive 40 shown in FIG. 3 so that the main stator winding 14 provides a constant frequency output, a lighter weight converter 70 shown in FIG. 4 may be used to suitably process the output of the main stator winding 14 in order to convert the variable frequency current induced in the main stator winding 14 by the variable speed rotation of the squirrel cage rotor 18 to constant frequency AC output power.

Accordingly, the output of the main stator winding 14 is connected to a full-wave rectifier bridge 72 which rectifies the variable frequency output of the main stator winding 14 to DC. A capacitor 74 is connected across the full-wave rectifier bridge 72 in order to smooth the AC ripple on the DC output of the full-wave rectifier bridge 72. An inverter 76 is connected across the capacitor 74 in order to invert the DC across the capacitor 74 to AC at an output 78 of the inverter 76.

The inverter 76, for example, may include a plurality of switches and a look up table storing PWM switching patterns for the switches. The switches may be arranged in a manner similar to the switches of the PWM inverter 22, and are connected across the capacitor 74. The common junctions of the switches provide three-phase AC output power at the output 78. The stored PWM switching patterns are selected from the look up table to provide the desired constant frequency AC output on the output 78. This constant frequency AC output on the output 78 supplies AC electrical loads. Furthermore, the voltage across the capacitor 74 may be tapped at 80 in order to supply output DC to DC loads.

Figure 5:
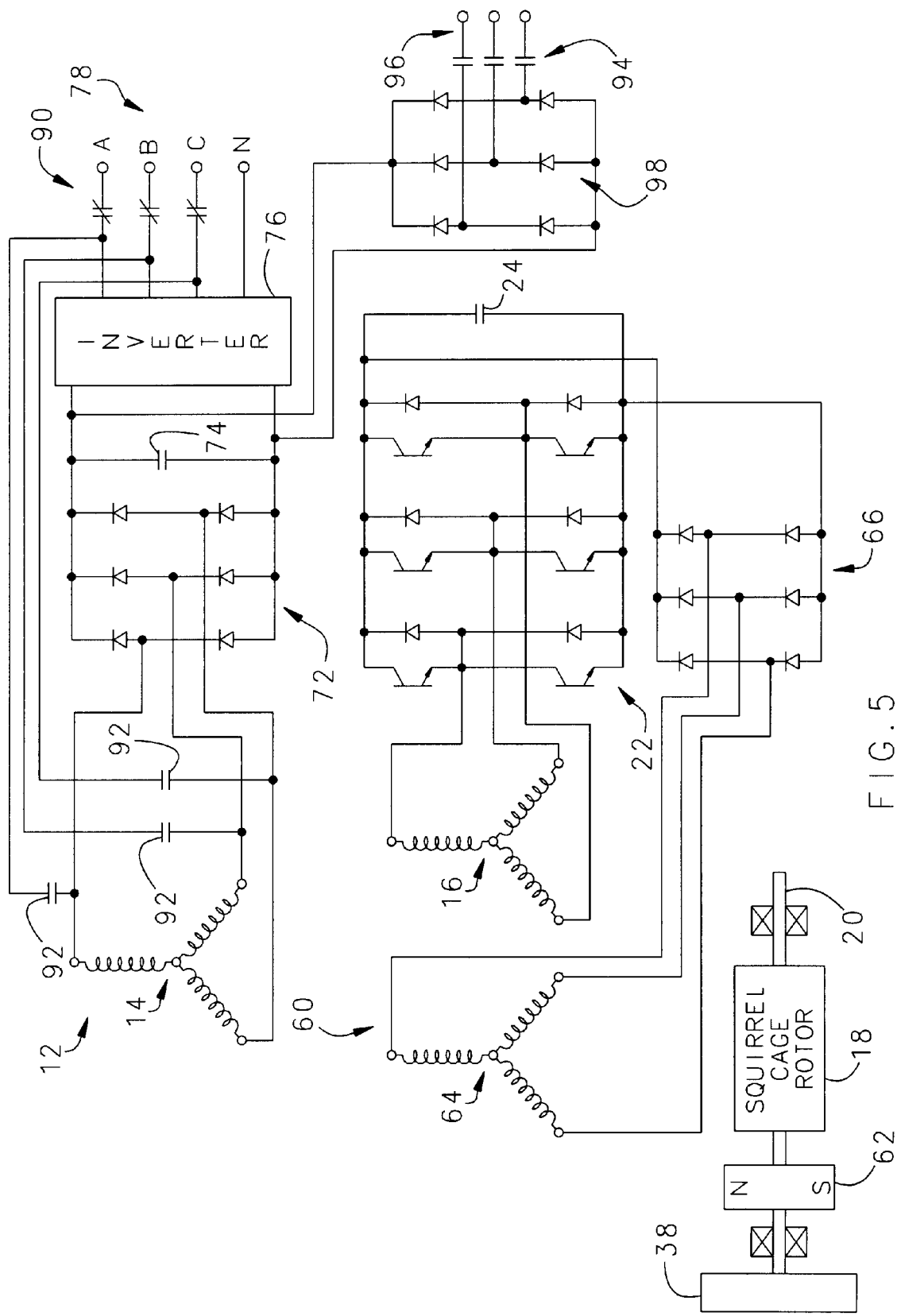
FIG. 5 is a schematic diagram of a power conversion system employing an induction motor/generator system according to a fifth embodiment of the present invention.

It is noted that the arrangement shown specifically in FIG. 4 is arranged only for power generation. FIG. 5 illustrates an arrangement that may operate both as a generator and as a starter. Accordingly, when the induction machine 12 is to be used as an engine starter, a first set of contacts 90 is opened and second and third sets of contacts 92 and 94 are closed. When the third set of contacts 94 close, AC from the AC tie bus 96 is rectified to DC by a full-wave rectifier bridge 98, and this DC is supplied to the inverter 76. The inverter 76 is controlled so as to invert this DC to AC of increasing frequency which is then supplied through the second set of contacts 92 to the main stator winding 14 in order to turn the squirrel cage rotor 18 to start the engine 38. Once the engine 38 is running, the permanent magnet generator 60 supplies excitation current through the full-wave rectifier bridge 66 and the PWM inverter 22 to the auxiliary stator winding 16.

Figure 6:
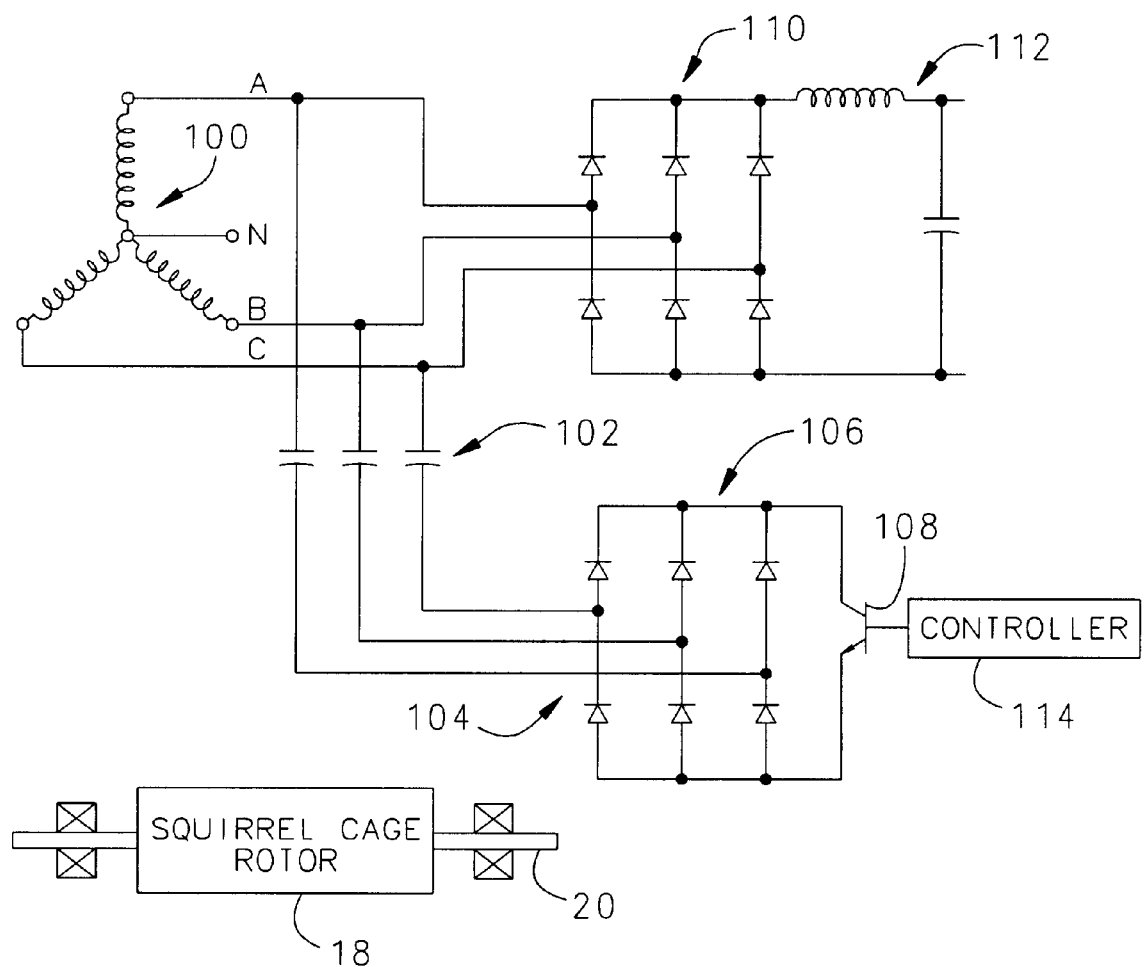
FIG. 6 is a schematic diagram of a power conversion system employing an induction motor/generator system according to a sixth embodiment of the present invention; and, FIGS. 7–9 are schematic diagrams of a power conversion system employing an induction motor/generator system according to a seventh embodiment of the present invention.

FIG. 6 shows an embodiment of the invention which does not require an auxiliary stator winding. In this embodiment, a stator winding 100 is magnetically coupled to the squirrel cage rotor 18 which is mechanically coupled to the shaft 20. Excitation current in the stator winding 100 is controlled by a capacitor bank 102 having a capacitor for each phase of the stator winding 100. The capacitor bank 102 is controlled by an electronic switching arrangement 104 comprising a full-wave rectifier bridge 106 and a switch 108. The output from the stator winding 100 is also supplied to a full-wave rectifier bridge 110 and a filter 112 in order to supply a DC output. This DC output may be used to supply DC loads.

A PWM voltage controller 114 controls the switch 108 in response to voltage across the output of the stator winding 100 in order to provide the proper level of excitation current during power generation. More specifically, the output voltage across the filter 112 may be compared to a reference to produce an error signal, and this error signal may be used by the PWM voltage controller 114 to control the switch 108 in order to provide the proper level of excitation current during power generation. Accordingly, the electronic switching arrangement 104 operates the capacitors of the capacitor bank 102, in effect, as variable capacitors.

In addition, if a second stator winding is magnetically coupled to the squirrel cage rotor 18, the windings of the stator winding 100 and of the second stator winding may be spaced so as to mechanically control the phase shift between the voltages produced by the stator winding 100 and the second stator winding, and capacitors 102 could electronically control the phase shift between the voltages produced by the stator winding 100 and the second stator winding.

Figure 7:
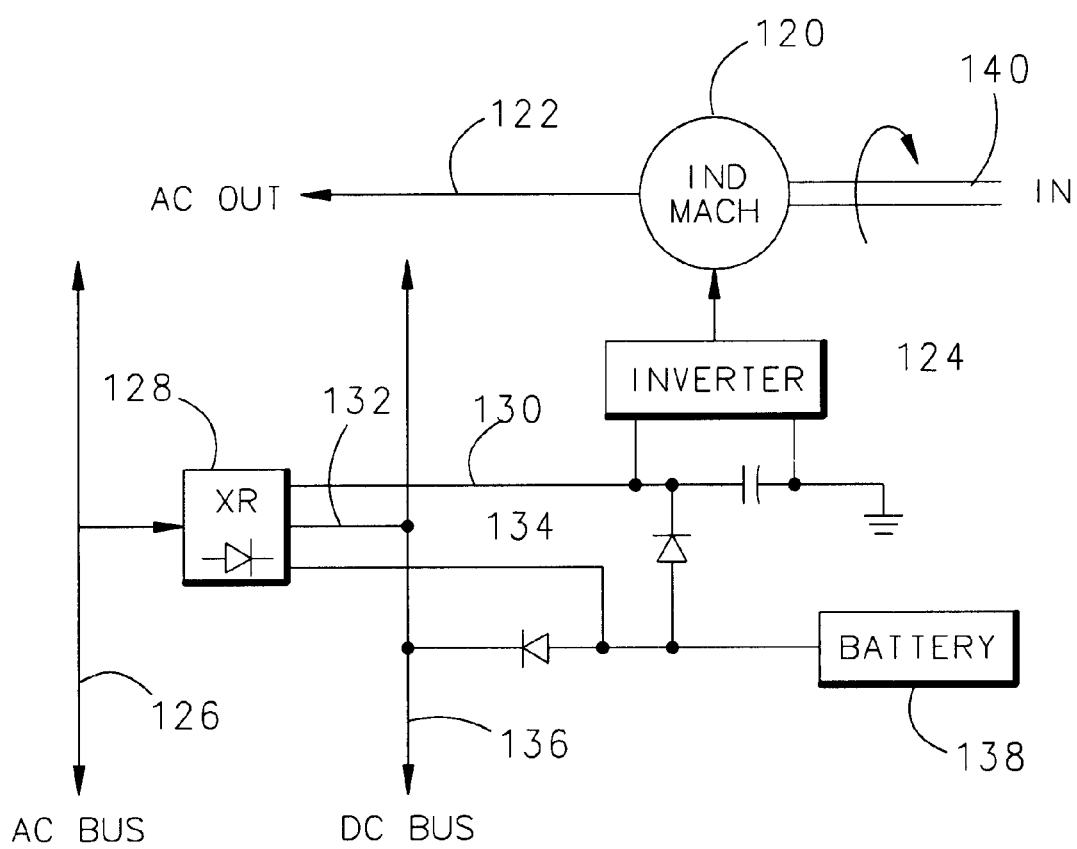

As shown in FIG. 7, an induction machine 120 has a main stator winding for providing an AC output 122 and an auxiliary stator winding for receiving excitation current from an inverter 124. An AC bus 126 is connected to the AC output 122 and also to a transformer-rectifier arrangement 128 described in alternative embodiments below. The transformer-rectifier arrangement 128 has first, second, and third DC outputs 130, 132, and 134. The first DC output 130 is coupled to the inverter 124, the second DC output 132 is coupled to a DC bus 136, and the third DC output 134 is coupled to a battery 138.

When the induction machine 120 is used as a starter, AC power is supplied to the AC bus 126 which is coupled by the AC output 122 to the main stator winding of the induction machine 120 in order to turn an output shaft 140 for starting an engine such as an auxiliary power unit (APU).

When the induction machine 120 is used as a generator, the output shaft 140 turns the rotor of the induction machine 120 in order to generate a voltage across its main stator winding. Also, excitation current is supplied to the auxiliary stator winding of the induction machine 120 by the inverter 124 which is sourced from either the battery 138 or the transformer-rectifier arrangement 128.

Figure 8:
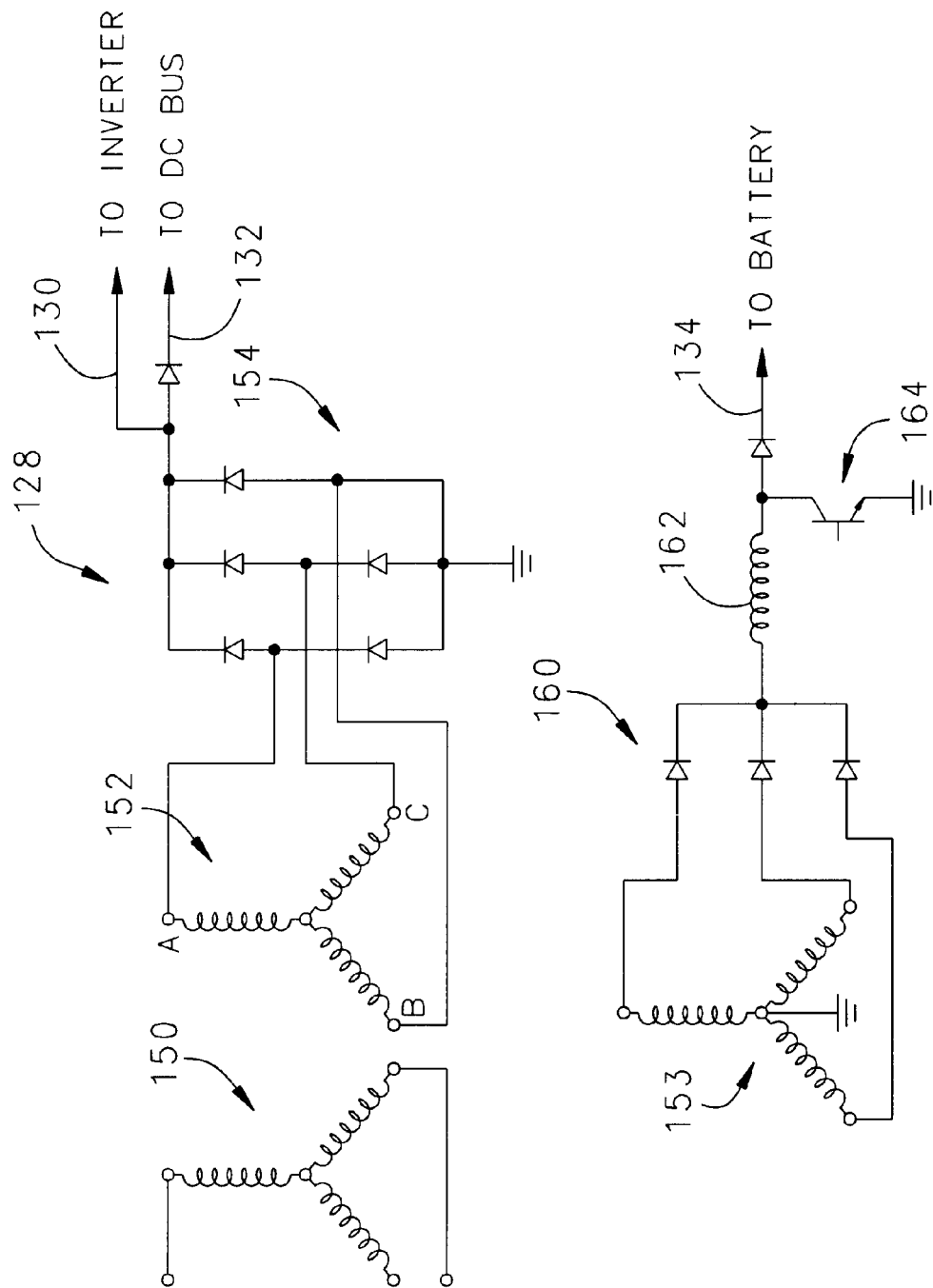

A first embodiment of the transformer-rectifier arrangement 128 is shown in FIG. 8 and includes a primary 150 and secondaries 152 and 153. The primary 150 is connected to the AC bus 126, and the secondary 152 is connected to a full-wave rectifier bridge 154. The full-wave rectifier bridge 154 is connected to both the inverter 124 and the DC bus 136. The secondary 153 is connected to diodes 160 and an inductor 162 which supplies current to the battery 138 under control of a switch 164. The switch 164 is turned on and off with a variable duty cycle in order to control the level of DC on the third DC output 134. As indicated in FIG. 8, the primary 150 and secondaries 152 and 153 may share a common core.

Figure 9:
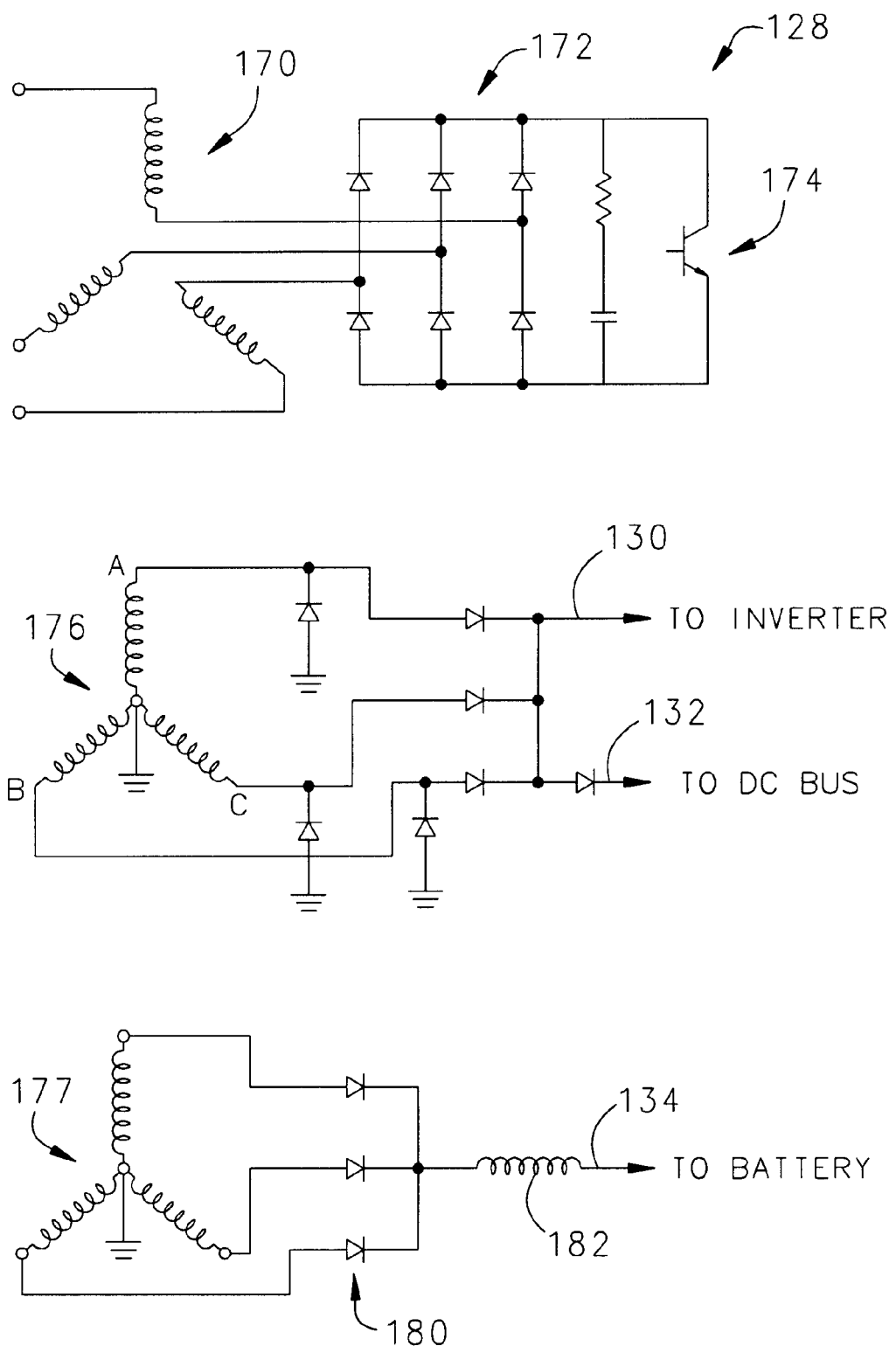

A second embodiment of the transformer-rectifier arrangement 128 is shown in FIG. 9 and includes a primary 170. One end of each winding of the primary 170 is connected to a corresponding phase of the AC bus 126, and the other end of each winding of the primary 170 is connected to a corresponding leg of a full-wave rectifier bridge 172 controlled by a switch 174. A secondary 176 is connected to the inverter 124 and the DC bus 136. A secondary 177 is connected through rectifiers 180 and an inductor 182 to. the battery 138. The voltage on the third DC output 134 may be compared to a reference voltage in order to produce an error signal, and the error signal may be used to control a PWM voltage controller which in turn controls the switch 174 in order to regulate the voltage on the DC output 134.

Certain modifications of the present invention have been discussed above. Other modifications will occur to those practicing in the art of the present invention. For example, as described above, the present invention may be used in conjunction with engines. However, it should be understood that the present invention may be used in conjunction with other types of prime movers.

Also, the present invention as described above is used to generate three-phase output power. However, the present invention may be used to generate output power having any number of phases.

Moreover, as described above in connection with the embodiment of FIG. 4, starting power is supplied by use of the auxiliary stator winding 16. Alternatively, starting power could be provided by way of the output 78 directly to the main stator winding 14 by closing the first and second sets of contacts 90 and 92. In this case, an additional set of contacts may be provided to isolate the PWM inverter 22 during starting.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A generator/starter system for starting an engine and for tapping power from the engine in order to generate electricity comprising:

a squirrel cage rotor so as to provide an AC output in response to rotation of the squirrel cage rotor and so as to rotate the squirrel cage rotor in response to an AC input;

an auxiliary stator winding magnetically coupled to the squirrel cage rotor so as to excite the main stator winding;

a source of excitation current coupled to the auxiliary stator winding;

a rectifier coupled to the main stator winding, wherein the rectifier is arranged to rectify a variable frequency AC output from the main stator winding to DC; and, an inverter coupled to the rectifier, wherein the inverter is arranged to invert the DC from the rectifier to AC.

2. The generator/starter system of claim 1 wherein the inverter is a first inverter, and wherein the source of excitation current comprises a second inverter having a DC input and an AC output coupled to the auxiliary stator winding.

3. The generator/starter system of claim 2 wherein the second inverter further includes a capacitor coupled to the DC input.

4. The generator/starter system of claim 2 wherein the second inverter further includes a PMG generator having a permanent magnet coupled to the squirrel cage rotor, a PMG winding magnetically coupled to the permanent magnet, and a rectifier coupled between the PMG winding and the DC input.

5. The generator/starter system of claim 1 further comprising:

an AC bus coupled to the AC output of the inverter; and, a switch coupling an AC output of the inverter to the AC output of the main stator winding.

6. The generator/starter system of claim 1 wherein the source of excitation current comprises an inverter having a DC input and an AC output coupled to the auxiliary stator winding.

7. The generator/starter system of claim 6 wherein the inverter further includes a capacitor coupled to the DC input.

8. The generator/starter system of claim 7 wherein the inverter further includes a PMG generator having a permanent magnet coupled to the squirrel cage rotor, a PMG winding magnetically coupled to the permanent magnet, and a rectifier coupled between the PMG winding and the DC input.

9. The generator/starter system of claim 6 wherein the inverter further includes a PMG generator having a permanent magnet coupled to the squirrel cage rotor, PMG winding magnetically coupled to the permanent magnet, and a rectifier coupled between the PMG winding and the DC input.

\* \* \* \* \*